United States Patent [19]

Farkus

[11] Patent Number: 5,054,428
[45] Date of Patent: * Oct. 8, 1991

[54] METHOD AND APPARATUS FOR REMOTE CONDITIONED CUE CONTROL OF ANIMAL TRAINING STIMULUS

[75] Inventor: Gregory J. Farkus, Tucson, Ariz.

[73] Assignee: Tri-Tronics, Inc., Tucson, Ariz.

[ * ] Notice: The portion of the term of this patent subsequent to Aug. 14, 2007 has been disclaimed.

[21] Appl. No.: 438,518

[22] Filed: Nov. 17, 1989

Related U.S. Application Data

[63] Continuation-in-part of Ser. No. 374,287, Jun. 29, 1989, Pat. No. 4,947,795.

[51] Int. Cl.⁵ .............................................. A01K 15/00
[52] U.S. Cl. ......................................... 119/29; 340/573
[58] Field of Search ........................... 119/29, 96, 106; 340/573

[56] References Cited

U.S. PATENT DOCUMENTS

| | | | |
|---|---|---|---|
| 3,589,337 | 6/1971 | Doss | 119/29 |
| 4,202,293 | 5/1980 | Gonda et al. | 119/29 |
| 4,335,682 | 6/1982 | Gonda et al. | 119/29 |
| 4,440,160 | 4/1984 | Fischell et al. | 128/132 |
| 4,524,773 | 6/1985 | Fischell et al. | 128/419 |
| 4,539,937 | 9/1985 | Workman | 119/29 |

Primary Examiner—Gene Mancene
Assistant Examiner—R. Thomas Price
Attorney, Agent, or Firm—Cahill, Sutton & Thomas

[57] ABSTRACT

A technique is disclosed for further training or control of a dog that has been previously trained to conform to a particular desired behavior. If the dog fails to conform to the expected behavior, a first remote control signal is transmitted to a collar-mounted receiver-stimulator to produce a first conditioned cue as a short duration electrical stimulation signal applied to the animal, to get the animal's attention and inform it that continued failure to conform to the expected behavior will result in a higher degree of electrical stimulation. If the animal fails to conform to the expected behavior, a second control signal is generated to produce a second conditioned cue of a higher degree of electrical stimulation than the first to the animal. Such subtle conditioned cues result in effective control or training of the dog with little or no discomfort to it.

12 Claims, 1 Drawing Sheet

METHOD AND APPARATUS FOR REMOTE CONDITIONED CUE CONTROL OF ANIMAL TRAINING STIMULUS

CROSS-REFERENCE TO RELATED APPLICATION

This application is a continuation-in-part of the commonly assigned application entitled "BARKING CONTROL DEVICE AND METHOD", Ser. No. 374,287, filed June 29, 1989 now U.S. Pat. No. 4,947,795 by the present inventor, incorporated herein by reference.

BACKGROUND OF THE INVENTION

The invention relates to methods and apparatus for remotely, quickly producing conditioned cue signals in the form of precisely measured, progressively increasing degrees of electrical stimulation signals applied to the animal by a collar-mounted receiver-stimulator unit worn by the animal. If the initial conditioned cue stimulus fails to cause the animal to conform to an expected behavior, the degree of conditioned cue stimulation can be precisely, progressively increased.

For a number of years the present assignee has manufactured and marketed remote dog training devices that each include a remote control hand-held radio transmitter and a collar-mounted lightweight radio receiver with associated electronic circuitry that detects coded radio signals from the transmitter unit and then delivers electrical stimulus signals to the dog. A problem that the assignee has spent years attempting to solve is that of providing optimum stimulus levels to the dog for particular training situations. Some of the assignee's previously marketed devices that generate remote electrical stimulus to a dog in response to pressing of a button on the remote transmitter also first actuate an audible buzzer which can be heard by the dog at close range.

Unfortunately, the degree of electrical stimulation that will be most effective in training a dog is greatly dependent on the attentiveness of the dog to the trainer. In a typical training situation a fairly low level of electrical stimulation selectively applied by the trainer (by actuating the remote transmitter) will be very effective in accomplishing the desired training goals if used by a skilled trainer in accordance with good dog training practice. However, if an event occurs that greatly distracts the dog, for example if another dog appears, a cat runs by, or a male dog smells a nearby female animal in heat, the degree of electrical stimulation may be inadequate. In other instances, the level of stimulation that the collar-mounted receiver-stimulator unit is capable of producing may be much more intense than is needed and may tend to overwhelm the dog. It is known that too great an electrical stimulus applied to the animal being trained under a particular set of conditions may have a bad overall affect on the dog's emotional well-being, just as excessively intense spanking inappropriate to the circumstances would be bad for a human child's emotional well-being. On the other hand, good dog training practice requires that the electrical stimulation must be sufficient to achieve the desired training objectives.

If the trainer is unable to apply an appropriate degree of stimulation that will prevent the dog from engaging in the undesired behavior, i.e., chasing the rabbit, the dog, which already knows as a result of prior training that the behavior is undesired, now learns that it can get away with the undesired behavior because the trainer did not take any immediate effective deterrent action (because the dog, due to the high level of distraction, did not even feel the stimulation that the trainer actually applied). The dog therefore believes that it now is somewhat acceptable to engage in the undesired behavior. The net effect of this scenario is that a large backward step in the training of the dog has just been taken.

The technique and apparatus described in commonly assigned U.S. Pat. No. 4,802,482, issued Feb. 7, 1989, entitled "METHOD AND APPARATUS FOR REMOTE CONTROL OF ANIMAL TRAINING STIMULUS" by Gerald Gonda et al., incorporated herein by reference, provides further flexibility to an animal trainer by enabling the trainer to immediately, remotely provide varying degrees of electrical stimulation to meet the needs of a training situation wherein there are rapid variations in the distraction levels to which the animal is exposed. However, that apparatus and technique does not allow use of very subtle conditioned stimulus to get the dog's attention.

The known remote training devices either operate in accordance with remotely controlled punishment or correction training techniques that attempt to cause the animal to stop a behavior by applying painful or uncomfortable stimulus, or by continuously applying increasing levels of stimulation (which are not necessarily painful or uncomfortable) until the animal responds as desired.

Many dog owners and professional dog trainers know that when a dog is held by a leash, and begins to deviate from a pre-established level of expected behavior to which the dog has been previously trained to conform, mild attention-getting techniques, such as abrupt jerking of the leash and short commands in a stern, raised voice are often effective if the dog knows that continued disobedience will result in immediate or uncomfortable stimulus, such as harder jerking of the leash or more severe scolding. However, if the leash is removed, such techniques apparently have been considered to be unsatisfactory. It has not been recognized how mild attention-getting techniques that are workable with a dog held captive by a leash could be effective with remote controlled electrical stimulus training devices.

There is a need for a more effective technique and apparatus for applying subtle stimulus to cause an animal to conform to expected, pre-established behavior with less discomfort to the animal than has been previously achievable.

SUMMARY OF THE INVENTION

Accordingly, it is an object of the invention to provide a technique and apparatus which allows remote generation of conditioned cues followed, if necessary, by remote application of electrical stimulus if an animal's behavior does not conform to expected standards.

It is another object of the invention to provide a method and apparatus for applying subtle stimulus by remote control to urge an animal, especially a dog, to conform to expected, pre-established behavior with less discomfort to the animal than is possible with prior remote control devices.

Briefly described, and in accordance with one embodiment thereof, the invention provides a technique for further training or control of an animal that has been previously trained to conform to a particular desired behavior, by instructing the animal to conform to the expected behavior, and if the animal fails to conform to the expected behavior, producing a first control signal by actuating a switch, and, in response to the first control signal, producing a first conditioned cue as a short duration electrical stimulation signal applied to the animal in response to the first control signal to get the animal's attention and inform it that continued failure to conform to the expected behavior will result in a higher degree of electrical stimulation. If the animal fails to conform to the expected behavior, a second control signal is generated by actuating a switch. In response to the second control signal, a second conditioned cue of a higher degree of electrical stimulation than the first is generated and applied to the animal. In the described embodiment, the animal wears a collar-mounted receiver-stimulator device which applies the electrical stimulation to the animal, wherein the first signal is produced in a remote transmitter that transmits the first control signal to the receiver-stimulator. The second control signal also is produced by the remote transmitter and received by the receiver-stimulator device. The first conditioned cue is produced by the receiver-stimulator by producing an enable pulse having a duration of approximately 3 milliseconds and applying it to a gated oscillator circuit which drives an output transformer to produce the electrical stimulation signal as the first conditioned cue and applies it as a single current pulse to electrodes which contacts the animal's skin. The second conditioned cue is produced by the receiver-stimulator by producing an enable pulse having a duration of approximately 12 milliseconds and applying it to the gated oscillator circuit which drives the output transformer to produce the electrical stimulation signal as the second conditioned cue and applies it as approximately four current pulses to the electrodes. If the second conditioned cue fails to get the animal's attention, the user can actuate a switch to produce a third control signal in response to which an enable signal having a duration of approximately 200 milliseconds is produced in the receiver-stimulator. That enable pulse is applied to the gated oscillator circuit to produce the electrical stimulation signal as the third conditioned cue. The electrical stimulation signal is applied as approximately 64 current pulses to the electrodes.

DETAILED DESCRIPTION OF THE PREFERRED EMBODIMENT

Figure 1:
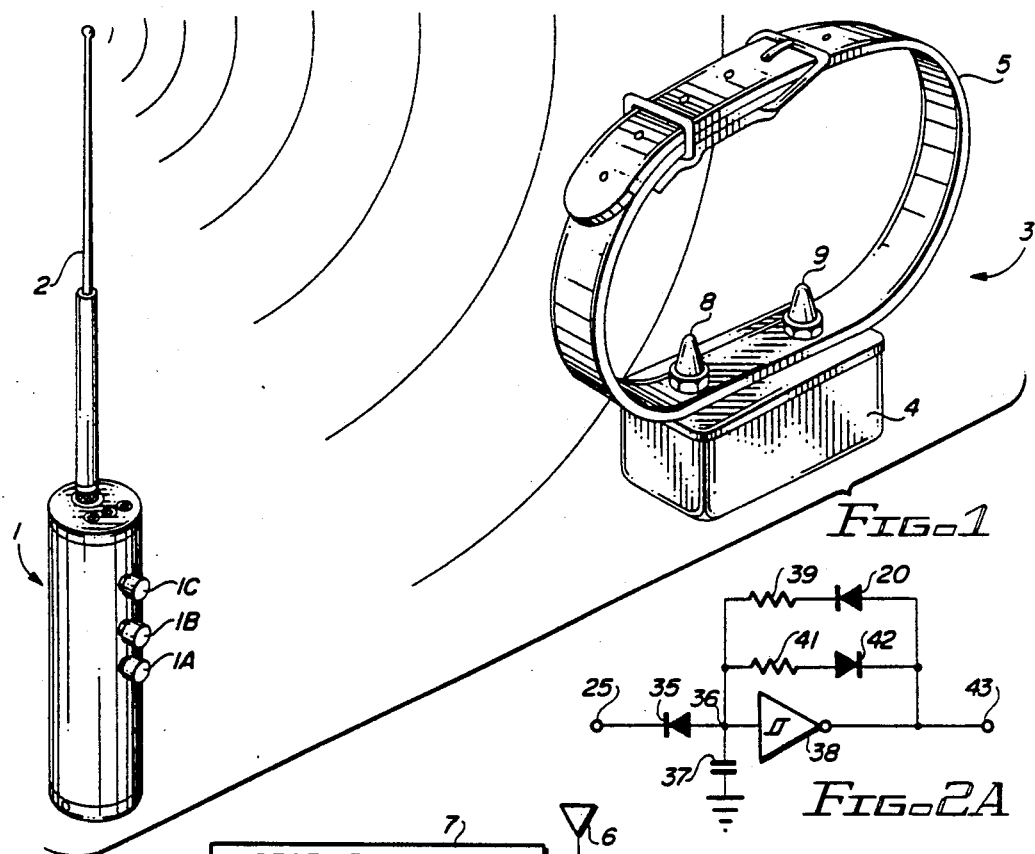
FIG. 1 is a diagram showing the portable transmitter and collar-mounted receiver-stimulator unit of the present invention.

Referring now to the drawings, particularly FIG. 1, reference numeral 1 designates a portable transmitter having an antenna 2 from which rf control signals can be transmitted to a collar-mounted receiver-stimulator unit 3. Receiver-stimulator 3 includes an electronics enclosure 4 supported by collar 5. Electrodes 8 and 9 are connected to an output transformer in enclosure 4 and extend through the collar to contact the skin of a dog's neck when the collar 5 is sufficiently tight. Reference numerals 1A and 1B designate two control switches of the portable transmitter 1 that allow immediate remote selection of precisely measured conditioned cues in the form of selected durations of electrical stimulation.

If control switch 1A is depressed, a first control signal is transmitted to receiver-stimulator 3, causing a single electrical stimulation current pulse to be produced between electrodes 8 and 9. If control switch 1B is depressed, a second control signal is transmitted to receiver-stimulator 3 causing a higher degree of electrical stimulation to be produced between electrodes 8 and 9 consisting of approximately four current pulses. If both switches 1A and 1B are depressed, a third control signal is transmitted, resulting in a still higher degree of stimulation consisting of approximately 64 current pulses between electrodes 8 and 9. Optionally, switch 1C can be depressed to produce continuous electrical stimulation consisting of periodic current pulses between electrodes 8 and 9 for the interval during which switch 1C is depressed.

Figure 2A:
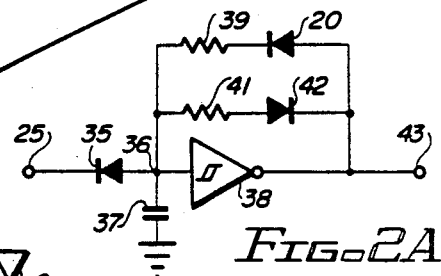
FIG. 2A is a schematic circuit diagram of the gated oscillator of FIG. 2.
Figure 2:
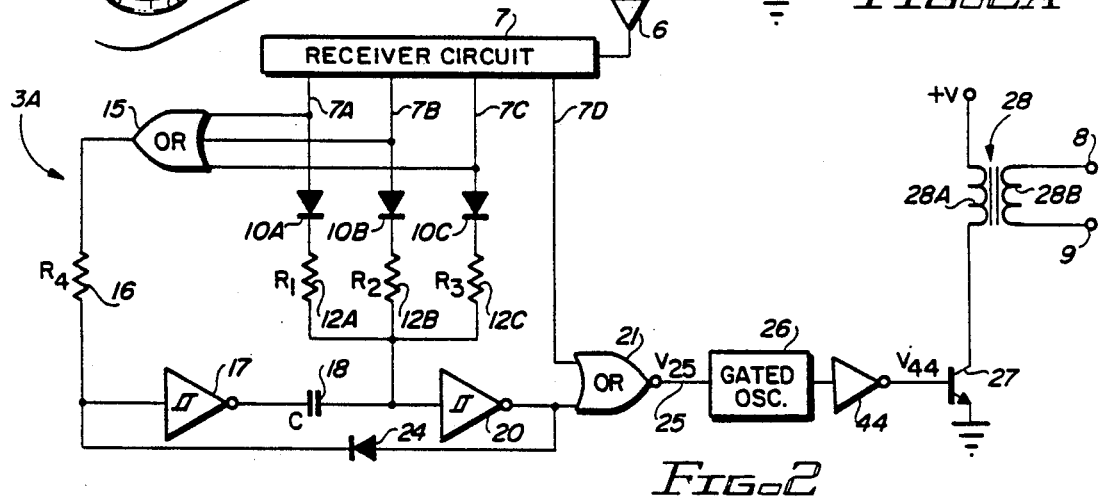
FIG. 2 is a schematic circuit diagram of the control circuitry carried in the collar-mounted unit of FIG. 1.

Referring next to FIG. 2, the circuitry 3A of receiver-stimulator 3 includes an antenna 6 connected to a radio frequency receiver circuit 7, which can be similar to the circuitry contained in the assignee's commercially marketed Model 200 system. Receiver circuit 7 has four output channels 7A, 7B, 7C, and 7D. Output 7A is connected to the anode of a diode 10A and to a first input of a three input OR gate 15. The cathode of diode 10A is coupled by resistor 12A (the resistance of which is R1) to conductor 19. Receiver output 7B is connected to the anode of diode 10B and to a second input of OR gate 15. The cathode of diode 10B is coupled by resistor 12B (the resistance of which is R2) to conductor 19. Output 7C of receiver circuit 7 is connected to the anode of diode 10C and to a third input of OR gate 15. The cathode of diode 10C is coupled by resistor 12C (the resistance of which is R3) to conductor 19. Receiver output 7D is connected to a first input of OR gate 21.

The output of OR gate 15 is connected by resistor 16 (the resistance of which is R4) to the input of an inverting Schmitt trigger 17, the output of which is coupled by a capacitor 18, the capacitance of which is C, to conductor 19. Conductor 19 is also connected to the input of inverting Schmitt trigger 20, the output of which is connected to the other input of OR gate 21 and to the anode of diode 24. The cathode of diode 24 is connected to the input of inverting Schmitt trigger 17.

The output of OR gate 21 is connected by conductor 25 to the control input of a 325 hertz gated oscillator circuit 26, the output of which is connected to the input of invertor 44. The output of inverter 44 is connected to the base of NPN transistor 27. The emitter of transistor 27 is connected to ground. The collector of transistor 27 is connected to one terminal of the primary winding 28A of a transformer 28. The other terminal of primary winding 28A is connected to power supply voltage +V. The terminals of the secondary winding 28B of transformer 28 are connected to electrodes 8 and 9, respectively.

Typical values of the resistors and capacitors in FIG. 1 are indicated in the following table.

TABLE 1

| COMPONENT | VALUE |
| --- | --- |
| R1 | 20 kilohms |
| R2 | 80 kilohms |
| R3 | 1.2 megohms |

TABLE 1-continued

| COMPONENT | VALUE |
| --- | --- |
| R4 | 100 kilohms |
| C | 0.1 microfarads |

FIG. 2A shows the circuit schematic of gated oscillator circuit 26. The control conductor 25 is connected to the cathode of a diode 35, the anode of which is connected by conductor 36 to one terminal of resistor 39, a first terminal of resistor 39, and input of an inverting Schmitt trigger circuit 38, and to one terminal of the capacitor 36, the other terminal of which is connected to ground. Inverting Schmitt trigger circuit 38 can be a readily available 74C14 integrated circuit. The second terminal of resistor 39 is connected to the cathode of a diode 40. The second terminal of resistor 41 is connected to the anode of a diode 42. The anode of diode 40 and the cathode of diode 42 are connected to the output of inverting Schmitt trigger 38. The output of inverting Schmitt trigger 38 is connected by conductor 43 to the input of inverter 44.

The enabled oscillator circuit of FIG. 2A operates in the following manner. In the absence of an enabling high level stimulation control signal on conductor 25, conductor 25 will be low, i.e., zero volts. Conductor 36 will be held at a low level through diode 35. Under this condition, the output of inverting Schmitt trigger 38 will be at a high voltage, and the circuit does not oscillate. If the signal on conductor 25 is high, diode 35 becomes reversed biased. The high voltage on conductor 43 then charges capacitor 37 through diode 40 and resistor 39 until the voltage on conductor 36 becomes high enough to switch inverting Schmitt trigger 38, causing conductor 43 to go to a low voltage. Capacitor 37, which is now charged, discharges through resistor 41 and diode 42 until the voltage on conductor 36 is low enough to cause inverting Schmitt trigger 38 to switch its output voltage on conductor 43 to a high level. Thus, the time interval during which the output waveform on conductor 43 is at a high voltage is determined by the time constant $R_{39}C_{37}$. At a time duration during which the output voltage on conductor 43 is low is independently set by the time constant $R_{41}C_{37}$. When the control signal on conductor 25 goes low, and hence the voltage on conductor 36 is pulled to ground, causing Schmitt trigger 17 to force the voltage on conductor 43 to its high resting state.

The secondary winding 28B of transformer 28 produces an open circuit stimulus voltage of roughly 5000 volts that is applied between electrodes 8 and 9 at the frequency of the signal $V_{43}$ when gated oscillator circuit 26 is enabled by a high level on $V_{25}$.

Figure 3A:
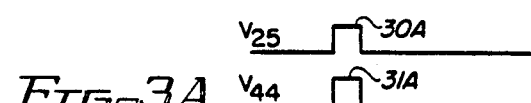
FIGS. 3A-3C constitute timing diagrams useful in describing the operation of the circuit of FIG. 2.
Figure 3B:
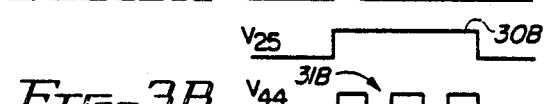
Figure 3C:
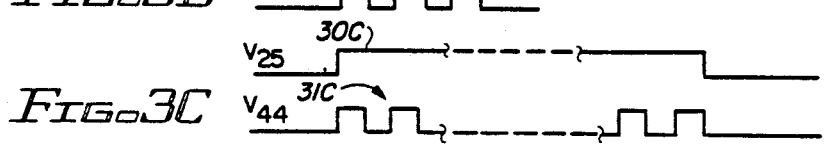

The operation of the circuit of FIG. 2 will be explained with reference to the timing diagrams in FIGS. 3A–C. If the lower button 1A is actuated, the duration of the oscillator enable pulse on conductor 25 is determined by the time constant $R_1C$, producing the $V_{25}$ pulse 30A of FIG. 3A of approximately 3 milliseconds duration on conductor 25. This causes gated oscillator circuit 26 to produce a single $V_{44}$ pulse 31A on conductor 43 as shown in FIG. 3A. The duration of each pulse produced by gated oscillator 26 is 1 milliseconds. If the upper button 1B of remote transmitter 1 is depressed, the duration of the voltage $V_{25}$ is determined by the time constant $R_2C$, and is approximately 12 milliseconds in duration, as indicated by pulse 30B in FIG. 3B. This enables gated oscillator 26 long enough to produce four $V_{44}$ pulses, as indicated by 31B in FIG. 3B. If both button switches 1A and 1B are depressed, the oscillator enable pulse $V_{25}$ has a duration of 200 milliseconds, as indicated by pulse 30C in FIG. 3C, enabling gated oscillator 26 to produce 64 $V_{44}$ pulses as indicated by 31A in FIG. 3C.

The user or trainer thus does not need to be concerned about how long the switches of the remote transmitter 1 are depressed. Simply depressing the switches in the above sequence produces automatically increasing, precisely measured durations of stimulation.

The trainer can thereby get the dog's attention under very delicate training situations without "overwhelming" the dog. The oscillator enable pulses $V_{25}$ in FIG. 3A result in shorter durations of stimulation produced directly in response to voltage $V_{44}$ than can be achieved for any known prior remote electrical training device. Because the stimulation duration is so short, the above-described apparatus can be used to make subtle corrections that do not overwhelm or distract the dog, especially when training the dog to point or retrieve. The dog maintains its "style" as the trainer makes slight adjustments to the dog's behavior.

An example of the type of training achievable by the subtle cues that can be remotely given to the dog by the above-described system is the situation in which a well-trained dog is in a pointing stance, and starts to creep forward when he shouldn't. The dog may unconsciously begin to lift a paw. The trainer observes this, depresses switch 1B, producing a single conditioned cue stimulation pulse across electrodes 8 and 9. It has been observed that the dog will slowly lower its paw and continue pointing without "creeping forward", aware that continued creeping will result in increasing conditioned cue stimulation. This type of training is impossible with any prior remote training apparatus.

As an optional, different mode of operation, if the dog becomes highly distracted, the trainer can, by depressing switch 1C, produce an enable pulse on conductor 7D in FIG. 2 of the same duration of time that switch 1C is depressed, thereby producing the intense stimulation necessary to regain control of the training situation. The duration of stimulation in this mode of operation is manually controlled by the length of time switch 1C is held depressed by the trainer.

The initial application of the electrical stimulation by the above apparatus to a "naive" dog is to produce a "startle" effect and a mild level of fear that predisposes the dog to effective training, without use of the much more intense stimulation of prior remote training devices. This has the advantage of causing less nervousness and confusion in the dog, and more responsiveness to other concurrent training activities.

While the invention has been described with reference to a particular embodiment thereof, those skilled in the art will be able to make the various modifications to the described embodiments of the invention without departing from the true spirit and scope of the invention.

What is claimed is:

1. A method of training an animal, comprising the steps of:
   (a) training the animal to conform to a desired behavior;
   (b) later inducing the animal to conform to the desired behavior;
   (c) if the animal fails to continue to conform to the desired behavior, producing a first control signal to produce a first conditioned cue as a low degree of electrical stimulation applied to the animal;

(d) producing the first conditioned cue as a short first preselected duration electrical stimulation signal applied to the animal in response to the first control signal to get the animal's attention and indicate to it that continued failure to conform to the desired behavior will result in a higher degree of electrical stimulation;

(e) if the animal fails to conform to the desired behavior, producing a second control signal to produce a second conditioned cue as a higher degree of electrical stimulation;

(f) producing the second conditioned cue as a second preselected duration electrical stimulation in response to the second control signal, the second preselected duration being substantially greater than the first.

2. The method of claim 1 including producing a third control signal to produce a third conditioned cue as a higher degree of electrical stimulation if after step (f) the animal still fails to conform to the desired behavior, and producing the third conditioned cue as an electrical stimulation of a third preselected duration that is longer duration than the second preselected duration.

3. The method of claim 2 wherein the animal wears a collar-mounted receiver-stimulator device for applying electrical stimulation to the animal, wherein the first control signal is produced in a remote transmitter which transmits the first control signal to the receiver-stimulator device and the second control signal is produced in the remote transmitter and transmitted to the receiver-stimulator device.

4. The method of claim 3 including producing the first control signal as a single pulse having a duration of approximately 3 milliseconds and applying it to a gated oscillator circuit which drives an output transformer to produce the first conditioned cue electrical stimulation signal and applies it to electrodes which contact the animal's skin.

5. The method of claim 4 including producing the second control signal as a single pulse having a duration of approximately 12 milliseconds and applying it to the gated oscillator circuit, causing the gated oscillator circuit to effectuate the second preselected duration electrical stimulation as approximately four pulses of approximately 1 millisecond duration each at a repetition rate of approximately 325 hertz.

6. The method of claim 5 including producing the third control signal as a single pulse having a duration of approximately 200 milliseconds and applying it to the gated oscillator circuit, causing the gated oscillator circuit to effectuate the third conditioned cue as approximately 64 pulses of approximately 1 millisecond duration each at a repetition rate of approximately 325 hertz.

7. An apparatus for controlling an animal, comprising in combination:

(a) means for producing a first control signal to produce a first conditioned cue as a low degree of electrical stimulation applied to the animal;

(b) means for producing the first conditioned cue as an electrical stimulation signal of a first preselected duration applied to the animal in response to the first control signal;

(c) means for producing a second control signal to produce a second conditioned cue as the higher degree of electrical stimulation after the first conditioned cue has been applied to the animal;

(d) means for producing the second conditioned cue as an electrical stimulation of a second preselected duration substantially greater than the first in response to the second control signal.

8. The apparatus of claim 7 including means for producing a third control signal to produce a third conditioned cue as electrical stimulation after the second conditioned cue, the electrical stimulation of the third conditioned cue being of substantially higher degree than that of the second conditioned cue.

9. The apparatus of claim 8 including a collar-mounted receiver-stimulator device for applying electrical stimulation to the animal, and including a remote transmitter including means for remotely controlling the first and second control signals produced in the receiver-stimulator device.

10. The apparatus of claim 9 including a gated oscillator circuit which drives an output transformer to produce the first conditioned cue electrical stimulation signal and apply it to electrodes which contact the animal's skin, and means for producing the first control signal as a single pulse having a duration of approximately 3 milliseconds and applying it to an enable input of the gated oscillator circuit.

11. The apparatus of claim 10 including means for producing the second control signal as a single pulse having a duration of approximately 12 milliseconds and applying it to the gated oscillator circuit, causing the gated oscillator circuit to effectuate the longer duration electrical stimulation as three pulses of approximately 1 millisecond duration each at a repetition rate of approximately 325 hertz.

12. The apparatus of claim 11 including means for producing the third control signal as a single pulse having a duration of approximately 200 milliseconds and applying it to the gated oscillator circuit, causing the gated oscillator circuit to effectuate the third conditioned cue as approximately 64 pulses of approximately 1 millisecond duration each at a repetition rate of approximately 325 hertz.

* * * * *